C. T. PORTER.
CENTRIFUGAL GOVERNOR.
No. 32,583. Patented June 18, 1861.
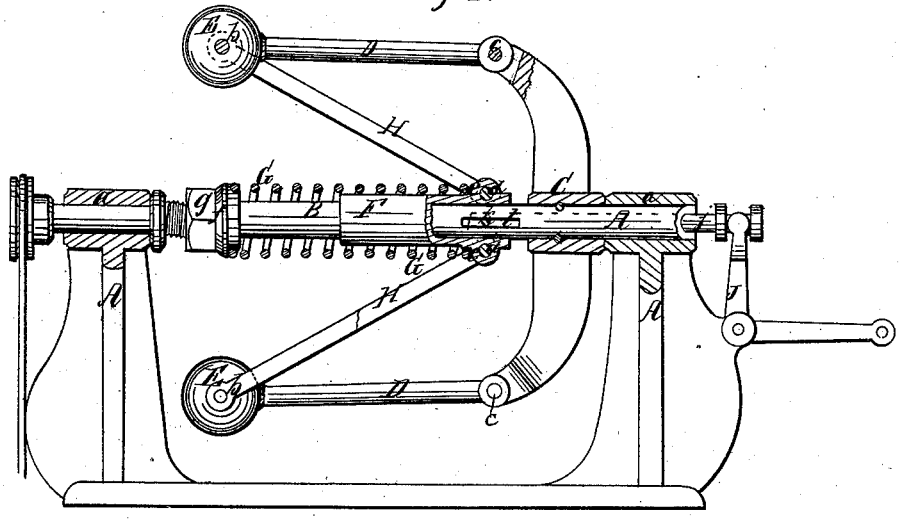
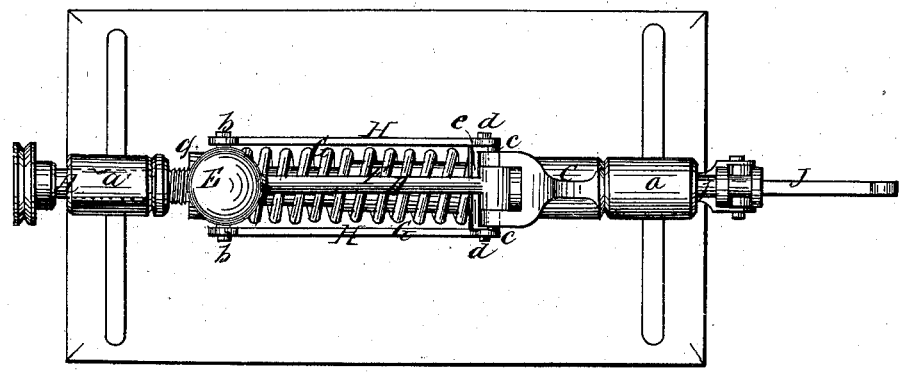
Witnesses:
Inventor:
Charles T. Porter

UNITED STATES PATENT OFFICE.

CHARLES T. PORTER, OF NEW YORK, N. Y.

CENTRIFUGAL GOVERNOR FOR STEAM-ENGINES.

Specification of Letters Patent No. 32,583, dated June 18, 1861.

*To all whom it may concern:*

Be it known that I, CHARLES T. PORTER, of the city, county, and State of New York, have invented a new and useful Improvement in Centrifugal Governors for Marine and other Steam Engines and other Motors; and I do hereby declare that the following is a full, clear, and exact description of the same, reference being had to the accompanying drawing, forming part of this specification, in which—

Figure 1 is a side view, partly in section, of a governor with my improvement. Fig. 2 is a plan of the same.

Similar letters of reference indicate corresponding parts in both figures.

This invention relates to the employment of the resistance of a spring as a counterpoise to the centrifugal force of the balls and arms of a centrifugal governor, by which means such a governor is made capable of working in a horizontal or other position and hence suitable for marine engines.

The improvement consists in so applying and combining the balls and arms and the spring, that in all positions of the balls and arms, the distance through which the spring is deflected shall bear a nearly constant ratio to the radius of the circle described by the center of gyration of the balls and arms, thereby making the governor extremely sensitive to the slightest variation in the speed of the engine.

To enable others skilled in the art to make and use my invention I will proceed to describe its construction and operation.

A is the frame of suitable construction to be bolted to the bulk-head of a steam-ship or to any other sufficiently firm support.

B is the main spindle arranged horizontally in suitable bearings $a$, $a'$, in the frame A.

C is a cross head firmly secured to the spindle A, for the attachment of the arms D, D, which carry the balls E, E.

F is a long sleeve working outside of the main spindle.

G is the counterpoise spring, of spiral construction and surrounding the sleeve F.

H H are rods, two on each side, connecting the balls with the sleeve; said rods having their length so proportioned to the length of the ball arms between the pins $b$, $b$, and $c$, $c$, which form the connections of the said arms with the said rods and cross-head, that when the ball-arms are parallel with the main spindle in which position they are intended to be when the governor is running at the desired speed, the pins $d$, $d$, which connect the said rods with the sleeve will be in the same plane or nearly so with the pins $c$, $c$, by which proportion and arrangement the movement of the sleeve will be caused to bear a very nearly constant ratio to the movement of the balls toward and from the center of the main spindle. The spring G, is compressed between a shoulder $e$, on the sleeve F, and a collar $f$, on the main spindle, the said collar being adjustable for the purpose of adjusting the deflection and consequent tension of the said spring by means of a nut $g$, fitted to a screw-thread on the spindle.

The principle of operation of this governor may be described as follows: The balls and their arms during their revolution exert centrifugal force at right angles with their axis of revolution; and such force in each ball and arm may be regarded as gathered in its center of gyration, and is resisted by its two joint pins $b$, and $c$. The proportion of this force which is resisted by each pin is to the whole force as the distance of the opposite pin from the center of gyration is to the length of the arm and ball between the two pins. The force which is resisted by the pins $b$, $b$, is caused to act through the rods H, H, upon the sleeve F, with a tendency to move the latter along the shaft in a direction to compress the spring G. The connecting rods H, H, do not exert any effective force, but the joint pins $b$, $b$, in the balls do. Now the number of revolutions in a specified time being given, the centrifugal force of a revolving body varies directly as the radius of the circle described by its center of gyration. On the other hand the resistance of a spring varies directly as the distance through which it has been deflected. The result of this is that if the spring G be deflected from its normal condition or position a distance which bears the same ratio to the distance of the center of gyration of either arm and ball from their common axis of revolution when the governor is at rest, that the longitudinal movement of the sleeve bears to the radial movement of the balls, then when such a velocity of revolution is given to the governor that the centrifugal force of the balls and arms revolving at this distance from the axis is in equilibrio with the resistance of the spring, these will also be in equilibrio in every other possible position of the governor, and the balls will revolve indifferently at any distance from the spindle; therefore instead of adjusting the spring to this point I adjust it so that the distance of its deflection when the balls are at rest is in a very slightly less ratio to the said radius so that an increase in the number of revolutions in a given time of from one (1) to five (5) per cent. is required to cause the balls to expand to the limit allowed them, and they will have a definite position corresponding to every rate of speed between these limits. By such adjustment whatever degree of sensitiveness is found most desirable can be attained; and besides this most desirable quality, this governor possesses another of equal importance, that is the rapid development of force on slight changes of speed in any position.

The connection of the governor with the valve may be made in various ways by the aid of a rod connected with its sleeve F. In the example represented, the connection is made by means of a rod $j$, which works through a hollow portion of the main spindle and is connected with the sleeve by a key $k$, which works through a slot $l$, in the spindle, and this rod passing through one end of the main spindle is intended to be connected with the valve by a bell-crank J, and such a system of rods levers or their equivalents as may be necessary.

I am aware that a spring has been employed to resist the centrifugal force of the governor balls; and also that a small degree of initial compression has been given to it. These, therefore, I do not claim, but

What I claim as my invention, and desire to secure by Letters Patent; is—

Giving to the spring of a centrifugal governor an initial deflection of such amount that, in every position of the balls the radius of the circle described by them and the distance through which the spring is deflected shall bear a nearly constant ratio with each other when constructed and operating substantially in the manner and for the purposes herein shown and described.

CHAS. T. PORTER.

Witnesses:
  M. M. LIVINGSTON,
  G. W. REED.